Dec. 8, 1931.   J. P. BYSON   1,835,273
SCRAPER ATTACHMENT FOR TRACTORS
Filed Jan. 15, 1929

Inventor.
John P. Byson
by Irwin & Hague, Att'ys.

Patented Dec. 8, 1931

1,835,273

UNITED STATES PATENT OFFICE

JOHN P. BYSON, OF ALGONA, IOWA, ASSIGNOR TO HORACE WALTERS, OF ROCKWELL CITY, IOWA

SCRAPER ATTACHMENT FOR TRACTORS

Application filed January 15, 1929. Serial No. 332,702.

This invention relates to improvements in scraper devices designed especially to be used on the front wheels of tractors of that type employing an axle which is adapted to swing about a vertical axis.

Considerable difficulty has been experienced in operating that type of tractors having the front wheels supported comparatively close together and adapted to travel between two rows of standing vegetation, such as corn, when the ground is muddy and covered with trash, inasmuch as the mud and trash gather on the wheels and collect between the upper surfaces of the wheels and the frame in such a manner as to clog the wheels and stop their rotation.

It is therefore the object of my invention to provide a scraper device which may be attached to a tractor of the type above described, in such a manner that the scraper will be rigidly supported and at the same time adapted to swing with the front wheels to be constantly in operative relation with the periphery of said wheels in such manner as to scrape the periphery free of dirt and foreign matter to prevent clogging.

More specifically it is the object of my invention to provide a scraper device which may be used in connection with that type of tractors having a fixed downwardly extending sleeve supported at the forward end of the tractor for carrying the steering post, and provided with an axle secured to the lower end of said steering post with wheels carried by said axle and supported close to the sleeve, whereby the scraper may be supported in rigid relation with the wheels and at the same time permitted to swing freely therewith, and mounted in such relation with said wheels that it will not interfere with the mechanism carried by said tractor frame.

My invention consists in the construction, arrangement and combination of the various parts of the device, whereby the objects contemplated are attained, as hereinafter more fully set forth, pointed out in my claims, and illustrated in the accompanying drawings, in which:

Figures 1, 2, 3, 4:
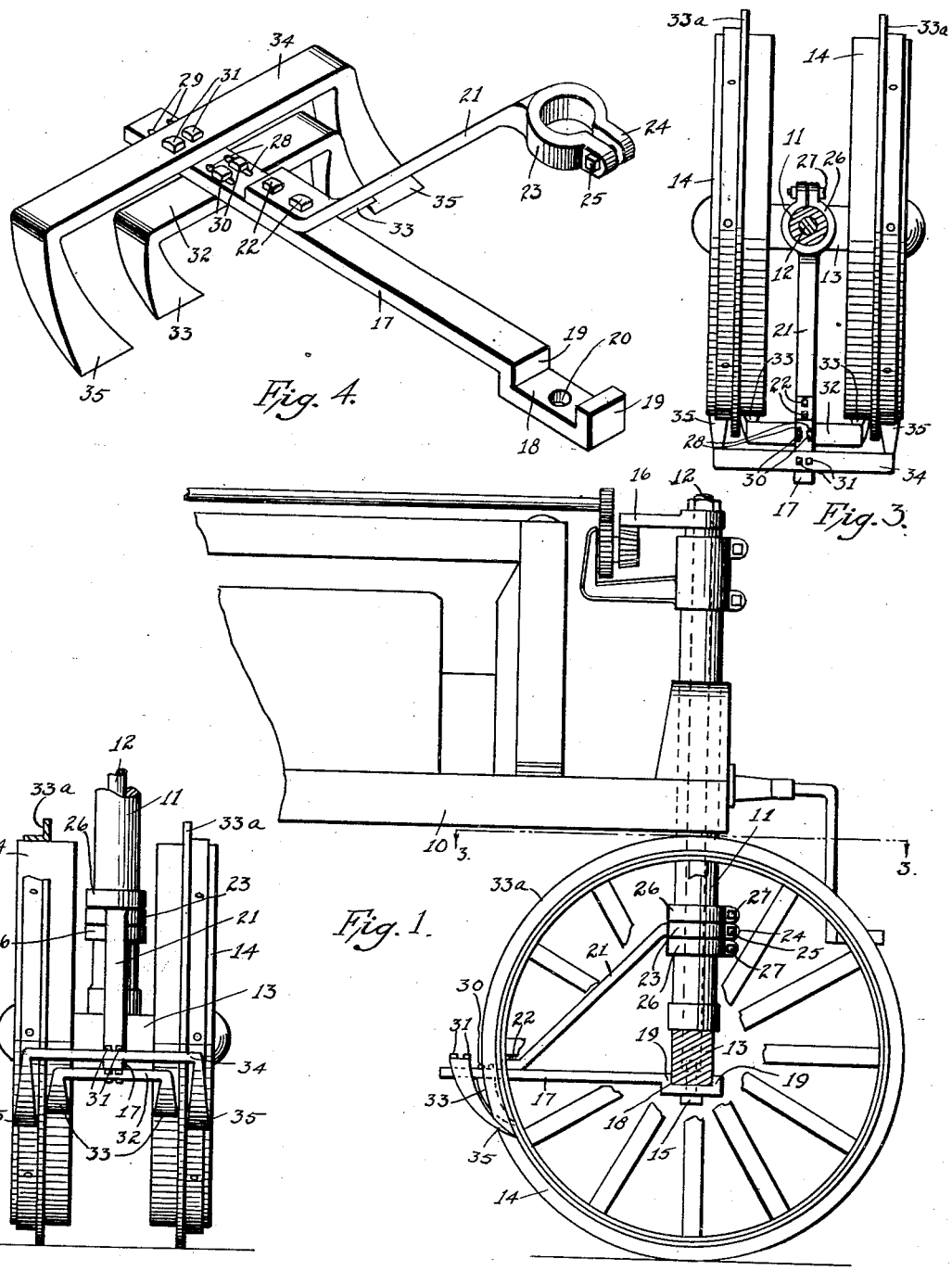
Figure 1 is a side elevation of the front end of a tractor showing the manner in which my improved scraper device is applied to the steering axle, a portion of the wheel being broken away to illustrate said scraper device.
Figure 2 is a rear elevation of the supporting wheels with a portion of the supporting sleeve and the scraper devices attached to the axle.
Figure 3 is a detail sectional view taken on the line 3—3 of Figure 1.
Figure 4 is a perspective view of the scraper attachment removed from the tractor.

The numeral 10 indicates the frame of a tractor having at its forward end a downwardly projecting sleeve 11 rigidly secured to said frame. The sleeve 11 is provided with a steering post 12 having at its lower end an axle 13 of rectangular cross section, each end of the axle being provided with a wheel 14. It will be seen in Figures 2 and 3 that the said axle is very short which permits the wheels to operate close to the sleeve 11.

The axle 13 is secured to the post 12 by means of a set screw 15. The upper end of the post 12 is provided with gear mechanism 16, by means of which the said post is rotated, which in turn will cause the axle 13 to be swung about a vertical axis for steering the tractor.

My improved scraper device comprises a scraper arm 17 made of a heavy flat bar having its forward end bent to form a depression or recess 18, which is adapted to fit the under surface of the axle 13 with the shoulders 19 of the recess resting against the forward and back surfaces of the axle.

The arm is secured in position by removing the set screw 15 and passing it upwardly through an opening 20 in the said arm. The original set screw of the axle 13 is substituted with a longer and similar set screw. By this means the scraper arm is rigidly secured to the under surface of the axle and projects horizontally and rearwardly midway between the wheels 14, with the rear end of the arm extending a slight distance beyond the back surface of the said wheels.

A brace 21 has one end secured to the upper surface of the rear end of the arm 17 by means of suitable bolts 22. The brace is designed to extend upwardly and forwardly and has its forward end provided with a bifurcated bearing portion 23. Lugs 24 are provided for receiving a bolt 25. The members 23 are formed of bendable material so that the said members 23 may be forced into position around the sleeve 11 by passing said sleeve between the members 24, after which the bolt 25 is placed in position and the free ends of the members 23 drawn together so that the said members 23 are rotatively mounted on the sleeve 11.

Split collars 26 are placed above and below the members 23 and rigidly secured in position by means of bolts 27, to prevent longitudinal movement of the members 23 relative to the sleeve 11. By this means it will be seen that the rear end of the scraper arm is rigidly supported against up and down movement, and especially against upward movement, as it will be seen that tremendous upward strain is imparted to the scraper arm as the wheels 14 rotate.

The rear end of the arm 17 is also provided with slots 28 and 29 for receiving bolts 30 and 31. The bolts 30 are adapted to adjustably secure a scraper bar 32 to the under surface of the arm 17. Each end of the scraper bar 32 is provided with a downwardly and forwardly extending scraper member 33. The members 33 are designed to engage the inner edge of the periphery of the wheels 14 inside of the flanges 33.

A second scraper bar 34 may also be provided which is secured in position by means of the bolts 31. The bar 34 has scraper devices 35 designed to engage the periphery of the wheels 14 outside of the flanges 33 in the manner clearly illustrated in Figures 2 and 3.

By this arrangement it will be seen that I have provided a scraper device which may be easily and quickly attached to that type of tractors having a fixed downwardly extending sleeve and an axle of rectangular cross section, pivotally mounted to the lower end of said sleeve, so that the scraper is adapted to swing with the wheels and to always be in operative relation with the wheels, and to free the periphery of said wheels from mud and foreign matter before they are carried to the junction point of the sleeve 11 and the frame 10.

By providing the arm 17 of comparatively flat and wide metal and providing a recess to fit the under surface of the axle and securing the arm in position by means of set screws 15, it will be seen that means is provided for rigidly supporting the arm against lateral movement relative to the axle, while the brace 21 provides means for rigidly supporting the rear end of the arm against upward movement, and at the same time permits the scraper devices to freely move in conjunction with the swinging movement of the wheels.

It will further be seen that the scraper device is mounted substantially within the space between the wheels to not interfere with overhanging mechanism at each side of the wheels, which is often used in connection with farm tractors of this type, such as cultivator attachments. Any device supported outside of the steering wheels would more or less interfere with the operation of these auxiliary attachments.

Thus it will be seen that I have provided a scraper attachment of simple, durable and inexpensive construction which may be easily and quickly attached to a number of the tractors now in commercial use, and which is adapted to prevent clogging of the wheels when the tractor is operated in muddy fields.

I claim as my invention:

1. A scraper attachment for tractors comprising a flat scraper arm having one end bent to form a recess to fit the under surface of the axle of a tractor for supporting the steering wheels, said recess portion being provided with an opening for receiving a set screw, the rear end of said arm having a pair of slots, bolts for said slots, a scraper bar secured to said bolts, each end of said bar having downwardly and forwardly extending scraper members, a brace secured to the upper surface of said scraper arm extending upwardly and forwardly, the upper end of said brace bar terminating in a bifurcated portion having forwardly extending lugs, a bolt for said lugs, and a collar member adapted to be fixed above and below said bifurcated portions.

2. A scraper attachment for tractors comprising a flat scraper arm having one end bent to form a recess to fit the under surface of the axle of a tractor for supporting the steering wheels, said recess being provided with an opening for receiving a set screw, a scraper bar adjustably secured to the rear end of said arm, scrapers for said bar, a brace secured to the upper surface of the rear end of said bar extending upwardly and forwardly, the upper end of said brace terminating in a bifurcated annular portion adapted to receive the pivot supporting sleeve of an axle, and collars adapted to be fixed to said sleeve above and below said bifurcated portion, whereby the bifurcated portion will be supported against movement longitudinally of said sleeve and at the same time permit free movement of said bifurcated portion to rotate about said sleeve.

Des Moines, Iowa, January 7, 1929.

JOHN P. BYSON.